Patented Oct. 14, 1947

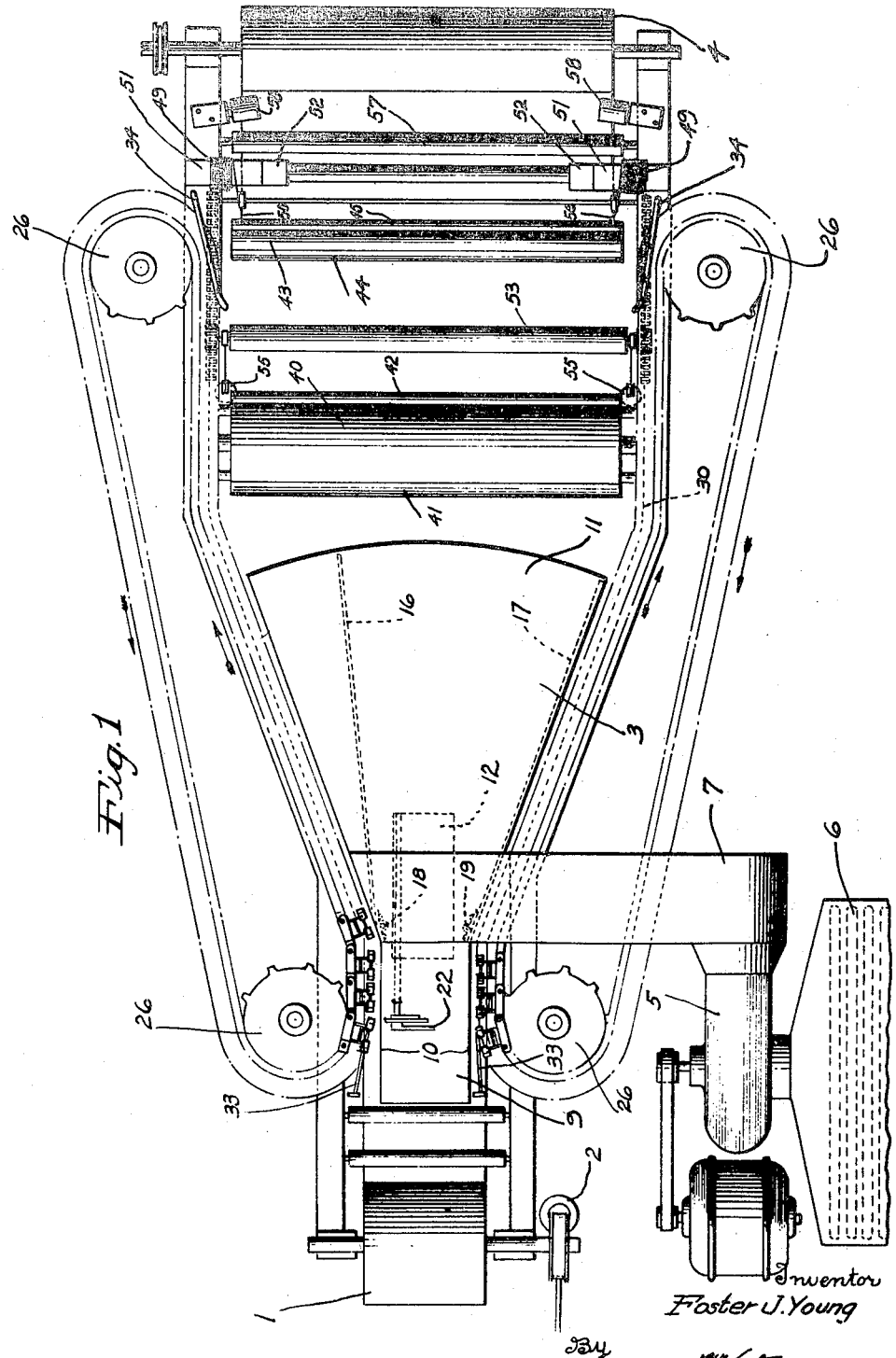

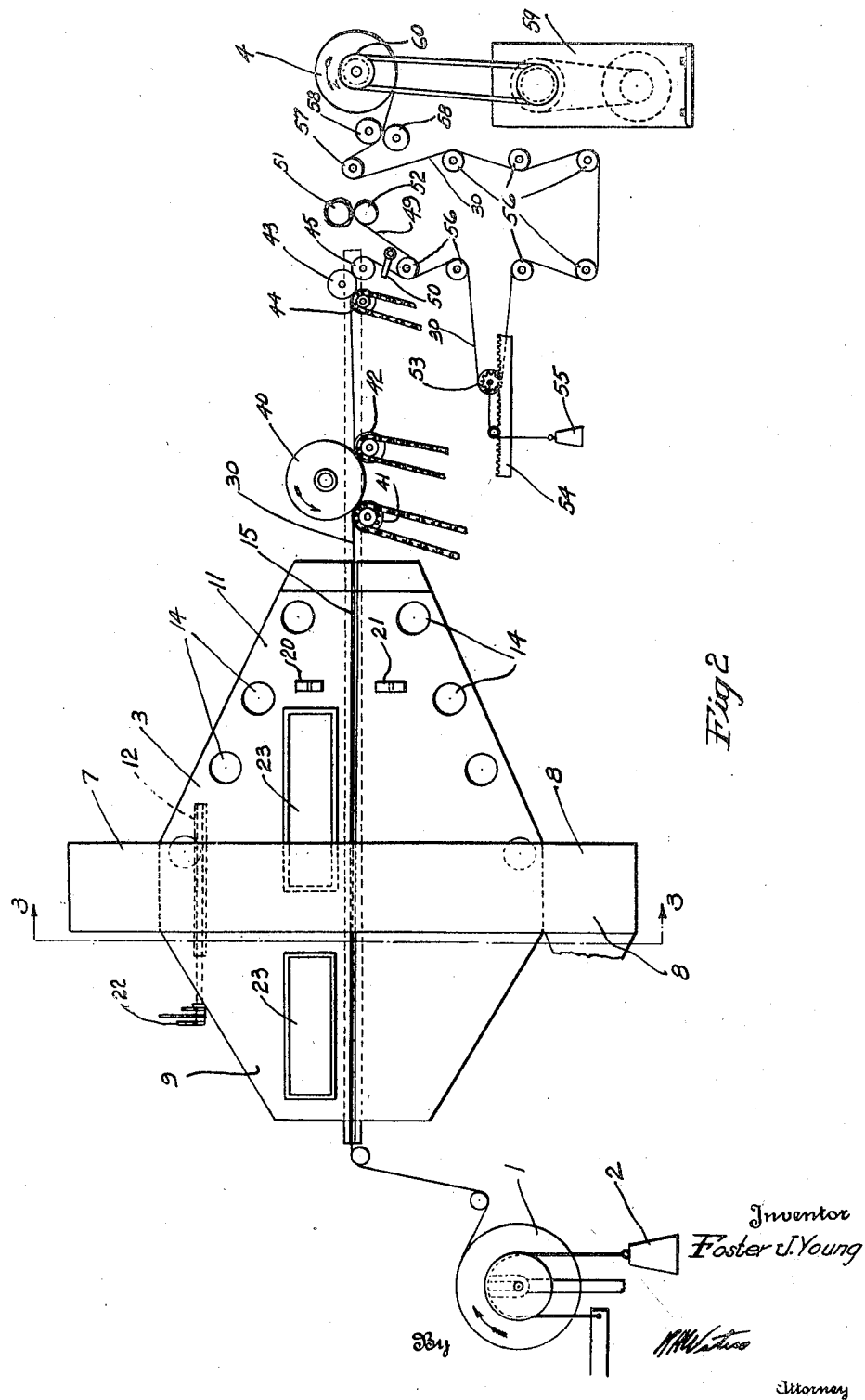

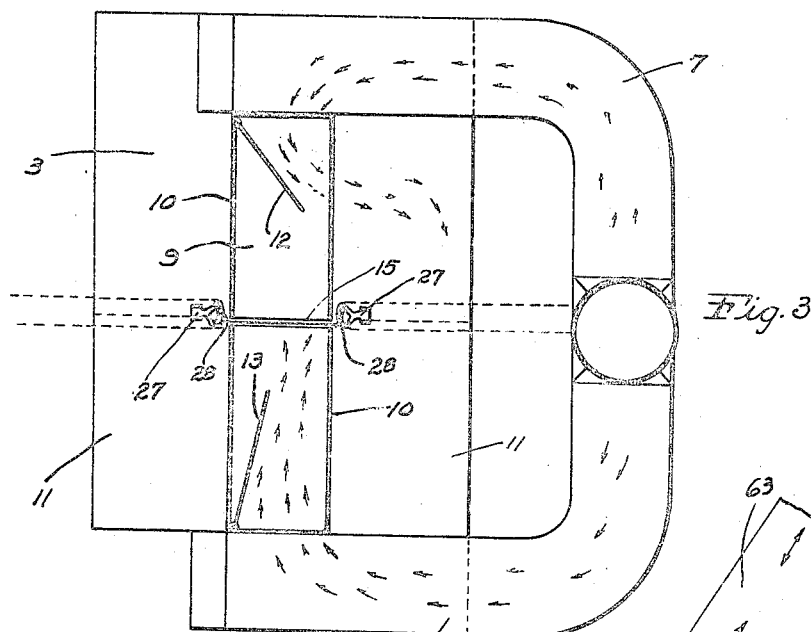
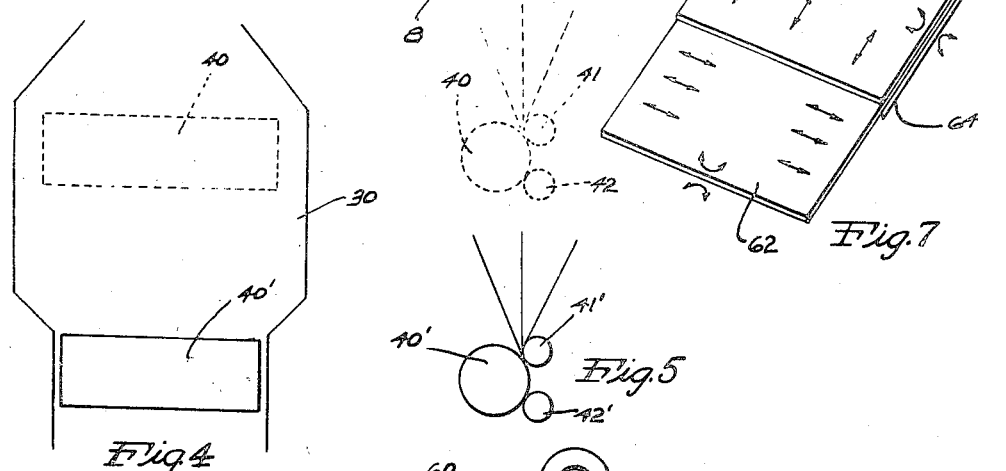

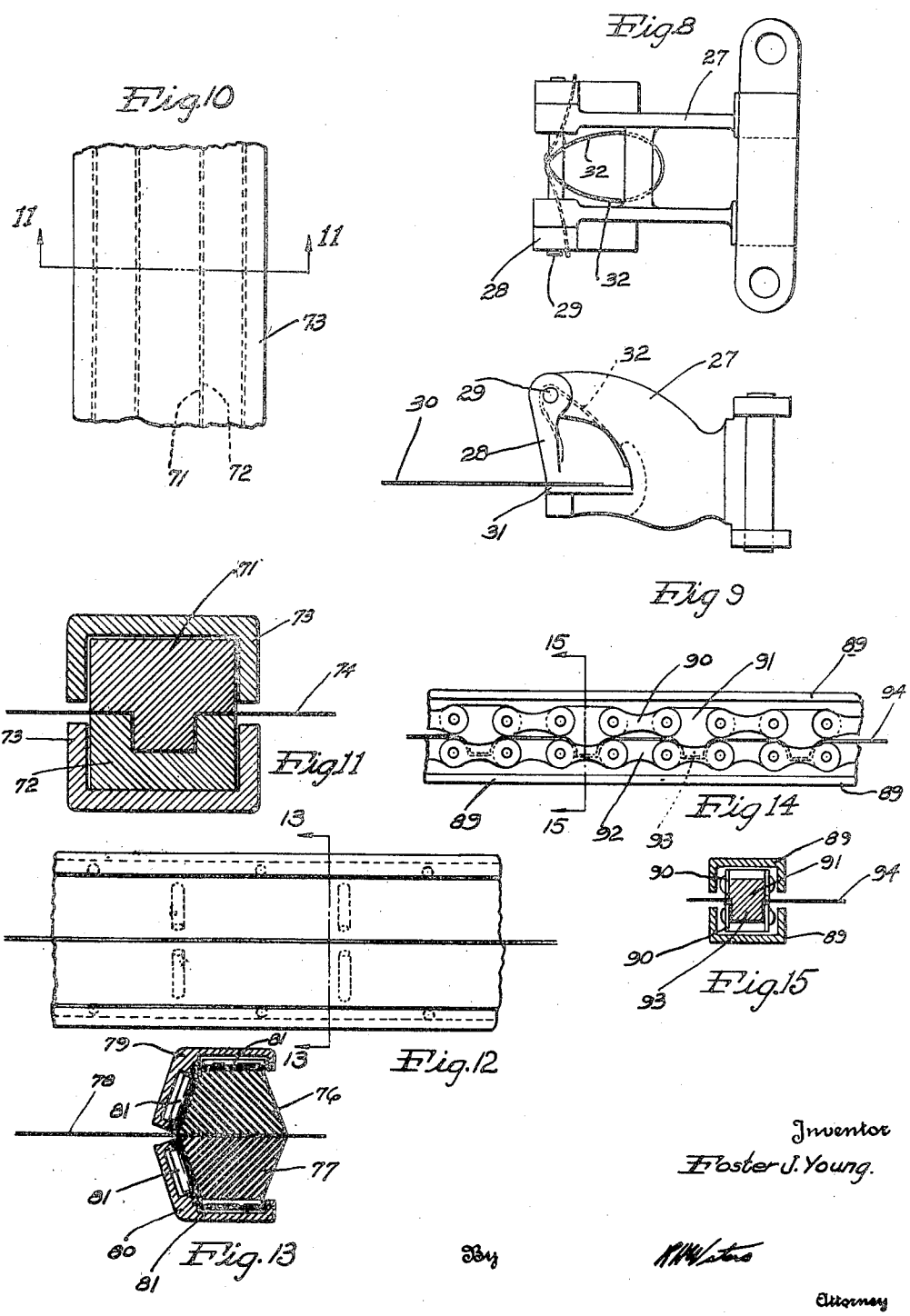

2,429,177

UNITED STATES PATENT OFFICE 2,429,177

STRETCHING AND LAMINATING FILM

Foster J. Young, Kent, Ohio, assignor to Wingfoot Corporation, Akron, Ohio, a corporation of Delaware Application July 25, 1940, Serial No. 347,465

3 Claims. (Cl. 154—124)

This invention relates to the treatment of a continuous film of a thermo-stretchable material, and more particularly the lateral stretching of such film. By "thermo-stretchable" is meant the ability to be stretched on heating. The internal viscosity of thermo-stretchable materials is sufficiently high so that after stretching they do not retract to their former dimensions unless heated. However, some retraction takes place as soon as the stretching tension is released. The invention includes the lamination of heat-sealable films, particularly the lamination of thermally stretched films. Although the invention will be described more particularly as related to the stretching and other treatment of rubber hydrochloride film, it includes the treatment of films of other thermo-stretchable materials, such as cellulose esters, polyvinyl derivatives, preferably plasticized, etc.

The invention includes various features of the method. It includes the method of heating while stretching laterally and cooling the stretched portions of the film so that the stretching becomes more uniform. It includes the process of laminating and more particularly the use of tension on the film while laminating and the continuous process of laminating laterally stretched film between plies of film stretched longitudinally. It includes other process features as defined in the claims.

The invention includes the product and more particularly the laterally stretched rubber hydrochloride film. It relates more particularly to the laminated sheet produced by laminating laterally stretched film between two plies of longitudinally stretched film. It includes other product features as defined in the claims.

Although the lateral stretching of a continuous film has been described in the art, it is believed that hitherto the process has never been carried on commercially, and so far as is known no commercial apparatus has been designed. In attempting to carry out such an operation in the production of products to be sold, various problems presented themselves. The solution of these problems was essential to the carrying out of the process on a commercial scale. The process of stretching a continuous film laterally differs radically from stretching a continuous film longitudinally. The simple method of stretching longitudinally comprises continuously passing the film over a heated roll which is driven at a low rate of speed and continuously pulling the film from the heated roll by pull rolls with a surface speed much higher than that of the heated roll. As the heated film leaves the heated roll it is rapidly cooled. As the power required to stretch the film in a heated condition is less than that required to stretch the film when cold, the longitudinal stretching occurs at the hottest zone of the film, and this is substantially a straight line adjacent the heated roll and its location on the film changes progressively as the film passes from the roll. As distinguished from such "straight line" stretching, the lateral stretching of film is an "area" stretching and one of the problems involved is to maintain the film at the desired temperature during stretching. The method of stretching laterally will be described more in detail in what follows.

The invention will be described in connection with the accompanying drawings which are illustrative. The invention is not limited thereto.

Fig. 1 is a plan view of apparatus for laterally stretching and laminating film; Fig. 2 is an elevation of the apparatus shown in Fig. 1; Fig. 3 is a section on the line 3—3 of Fig. 2; Fig. 4 is a plan view and Fig. 5 is an elevation showing more or less diagrammatically an alternative method of lamination; Fig. 6 shows more or less diagrammatically an elevation of apparatus for lamination; Fig. 7 shows a laminated sheet; Fig. 8 is a plan view and Fig. 9 an elevation of a tenter clip used in stretching the film; Fig. 10 is a plan view of alternative means for stretching; Fig. 11 is a section on the line 11—11 of Fig. 10; Fig. 12 is a plan view of other gripping means for stretching the film; Fig. 13 is a section on the line 13—13 of Fig. 12; Fig. 14 is an elevation of a different gripping means for stretching the film; and Fig. 15 is a section on the line 15—15 of Fig. 14.

Referring to the drawings, the film to be stretched is supplied from the roll 1. The weight 2 keeps the film under tension. The film passes through the oven 3 where it is heated and stretched and it is finally wound up on the wind-up roll 4.

The oven is heated by hot air. The air is forced into the oven by the fan 5 driven by an electric motor. The air entering the fan is heated as it passes over the steam coils 6. In the type of oven shown in the drawings the heated air enters the top of the oven through the conduit 7, and the bottom through the conduit 8. The front portion 9 of the oven is narrow. It is referred to herein as the pre-heater. The walls 10 of the pre-heater are parallel. In passing through the pre-heater the film is brought to a substantially uniform temperature. Thereafter it is stretched.

As the film is stretched laterally, it passes through the oven proper which is fan shaped. This portion of the oven is referred to herein by the reference numeral 11. Baffles 12 and 13 are provided to control the circulation of the hot air within this portion 11 of the oven.

The air is vented from the oven through the holes 14 and also through the opening 15 which separates the pre-heater and oven into an upper half and lower half which are entirely separate from one another. The film passes through this opening 15. The film is held tight and stretched by gripping means which are located outside of the oven. Within the oven are baffles 16 and 17 which prevent the hot air from passing directly out of the oven through the openings 14. These baffles are pivoted on the rods 18 and 19 so that they may be swung in an arc. The zone of the oven between the baffles 16 and 17 is at a considerably higher temperature than the zones between these baffles 16 and 17 and the outer walls of the oven in which the openings 14 are located. Although but two baffles 16 and 17 are shown in Fig. 1 there are corresponding baffles in the lower half of the oven. The location of the baffle 17 is varied by movement of the handle 20 and the location of the corresponding baffle at the bottom of the oven by movement of the handle 21. There are corresponding handles on the opposite side of the oven to control the position of the baffle 16 and the baffle located in that half of the bottom of the oven. The position of the baffle 12 is controlled by the handle 22. There is corresponding means (not shown) at the bottom of the oven for controlling the position of the baffle 13. The drawing shows doors 23 which may be removed to gain access to the interior of the oven.

In order to stretch the film laterally it is gripped at each side by gripping means which are moved progressively farther apart as the film passes through the oven. The preferred form of gripping means are tenter clips which may be of a usual design such as that shown in detail in Figs. 8 and 9. The tenter clips are linked together to form two chains, one on either side of the oven. These chains pass over the sprockets 26 which are operated at the same rate of speed. Suitable guiding means (not shown) which may be of the usual type is provided to cause the divergence of the two chains of tenter clips which is necessary to stretch the film laterally.

The tenter clips 27 comprise a latch 28 which is pivoted on the bar 29. As the latch swings down, it holds the film 30 against the plate 31 and the tension on the film draws this latch against the plate, and the greater the tension, the greater the force with which the film is held in place. The wire spring 32 was found to be advantageous to force the latch against the bottom plate 31 with sufficient force to hold the film in place before much tension has been applied to the film.

At the front of the machine on either side is a bar 33 and at the back of the machine on either side is a bar 34. As the tenter clips move toward the film at the front of the machine, the latches 28 press against the bars 33 and are thereby lifted off of the bottom plate 31. As the tenter clips come into position the latches 28 are thus lifted so that the film as it leaves the roll 1 and enters the pre-heater is stretched taut across the opening where the latch 28 later grips it. As the tenter clips come into position to grip the film they pass beyond the bars 33, and as the latches 28 pass out of contact with these bars, they fall onto the film and are pressed by the spring 32 against the film with sufficient force to obtain a tight grip on the film. The film is thus gripped tightly on each side by the tenter clips as it passes through the pre-heater. Then as it passes through the oven the tenter clips diverge and the film being gripped in the clips is stretched laterally.

As the tenter clips arrive at the rear of the machine after the stretching has been completed the bars 34 lift the latches 28 off of the base plates 31 and the film is thus released from the grip of the tenter clips. The tenter clips then return to the front of the machine, and the operation is repeated.

Turning now to Fig. 2, it is seen that the film 30 passes in contact with various rolls between the oven and the wind-up roll 4. The steel roll 40 is a heated roll. It is supported by the rolls 41 and 42. These rolls 41 and 42 are driven at a surface speed at least as great as the speed of the tenter chains. The pressure of the roll 40 on these two rolls 41 and 42 grips the film and pulls it forward in the center as well as at the sides to overcome the lagging due to the tendency of the laterally stretched film to retract in length.

The pressure of the heated roll 40 on the rolls 41 and 42 is used in lamination of the stretched film with other sheet material. When the lamination is effected by heat and pressure, as when one rubber hydrochloride film is laminated to another rubber hydrochloride film, it is advantageous to effect the lamination while the film is still hot from the stretching operation. The roll 40 which is a heavy heated roll is therefore located just beyond the oven. The film to be laminated to the stretched film 30 may be brought from above around the roll 40, or it may be brought from below around the roll 41. The heavy roll 40 presses against the rolls 41 and 42 with sufficient pressure to unite two or more plies of rubber hydrochloride film. If a three-ply sheet is desired, one film may be brought from above around the roll 40 and another film from below around the roll 41. If the film is to be stretched without lamination the rolls 40, 41 and 42 may be omitted.

The roll 43 is situated at a sufficient distance from the oven to permit the film to cool as it passes from the oven to this roll 43. The distance between the roll 43 and the oven is selected with due consideration for such factors as the internal viscosity of the film. The internal viscosity of an unplasticized rubber hydrochloride film is high as contrasted with the internal viscosity of a plasticized film, such as a film which contains ten per cent of butyl stearate. The internal viscosity of such a plasticized film is so low that the film, if the stretching tension is released when the film is cooled to room temperature, will almost immediately contract to its final dimensions. On the other hand, the internal viscosity of unplasticized film is so high that after the stretching tension has been removed when the film is cooled to room temperature, a considerable period of time elapses before the film assumes its final dimensions. The film continues to contract for a considerable period of time after the tension is removed. If the apparatus shown is used for stretching a plasticized film, the tension may be removed as shown when the tenter clips are about opposite the roll 43. In the short period of time which it takes for the film to pass from the roll 43 to the final wind-up roll 4, the film retracts so that it has obtained its final dimensions before it reaches the wind-up roll 4. If the apparatus is used for stretching unplasticized film, the film if cooled to room temperature at the roll 43 may advantageously be passed over a festoon before finally being wound on the wind-up roll 4. As an alternative procedure the film may be first wound on the wind-up roll 4 before all contraction has taken place and then be rewound on some other roll soon thereafter. Otherwise the retraction of the film after winding up causes the overlapping plies of the film on the wind-up roll to bind together as the film retracts. By cooling the film to a temperature above room temperature at the roll 43 (for example, to a temperature of 50° C.), a shorter time must pass before the film is finally wound on the wind-up roll. The retraction which occurs after releasing the tension at this higher temperature takes place much more rapidly than the rate at which the retraction takes place at room temperature, due to the lower internal viscosity of the film at the higher temperature.

This roll 43 cooperates with the rolls 44 and 45 to firmly grip the film, and the roll 44 is driven at a surface speed greater than that of the let-off roll 1 so as to impose a slight longitudinal stretch on the film as it passes through the oven. In stretching laterally the film tends to shrink longitudinally. It has been found best to overcome this by keeping the film taut longitudinally, and the best results have been obtained by having the rolls 43, 44 and 45 travel at a somewhat greater surface speed than the surface speed of the let-off roll 1.

The drawings show knives 50 located under the roll 45 for trimming off the edges of the stretched film. The stretching tension is released as the tenter clips are lifted by the rods 34 just before the film enters between the rolls 43 and 44. After the film passes off of the roll 45, all stretching tension has been released. The film starts to contract somewhat. If the film has been stretched five hundred per cent, it may retract some fifty per cent before it reaches a condition in which it is stable at room temperature. The knives 50 are placed to allow for some lateral shrinkage of the film before it reaches them. The trim 49 which includes the unstretched portion of the film which is outside the line of the tenter clips during the stretching operation is drawn off from the knives 50 and rolled up on the cores 51. These cores are supported on the driven rolls 52 which drive the rolls 51 by contact with the trim which is wound thereon.

As is usual in the commercial handling of film or sheet material on a continuous basis, a take-up roll 53 is provided. This roll is equipped with a gear which meshes with the teeth on the rack 54. The roll is pulled toward the front of the machine by the weight 55. This keeps a slight tension on the film after it passes over the roll 45 and permits for the taking up of slack or the letting out of slack as necessary to compensate for irregularities in the passage of fim through the machine without shutting down the apparatus.

The guide rolls 56 are proivded as means for conveying the film to the wind-up roll 4. The roll 57 may advantageously be made of sponge rubber when rubber hydrochloride film is being treated in order to remove any surface tackiness from the rubber hydrochloride. The rolls 58 are rubber covered rolls which are set at a slight angle to keep the film taut and prevent wrinkling of the film on the wind-up roll 4. The wind-up roll may advantageously be driven by a variable speed drive 59, so that the speed at which the core 60 is rotated may be decreased as the amount of film wound on the cores is increased.

Reference has been made to the use of the rolls 40, 41 and 42 for lamination of the laterally stretched film to other sheet material, as, for example, other rubber hydrochloride film. Figs. 4 and 5 show an alternative arrangement for lamination. As indicated in Figs. 4 and 5, the rolls 40, 41 and 42 are situated just beyond that portion of the film 30 where the lateral stretching has been completed. The film extends beyond the ends of the roll 40, because the tenter clips pass outside the ends of this roll. Instead of locating the laminating roll at this position, it may be advantageous to allow the film to retract somewhat before laminating it to other sheet material. The fact that such retraction occurs was above referred to. If instead of locating the rolls 40, 41 and 42 at a point just beyond that at which the lateral streching of the film has been completed, the rolls are located where the roll 43 is shown in Fig. 1 or even at a point somewhat further removed from the oven, the film will contract at least to some extent before the lamination. The rolls 40′, 41′ and 42′ are shown in Figs. 4 and 5 as being located beyond the point of such contraction. The present position of the rolls is indicated in dotted lines in Figs. 4 and 5 and the alternative position here suggested is shown in full lines and the reference numerals are distinguished by the use of primes in the latter instance.

In laminating film such as rubber hydrochloride film, difficulty has been experienced in obtaining a film which does not curl. A stretched film which at room temperature is stable becomes unstable when heated to a higher temperature since the internal viscosity is lowered on heating and the film contracts or retracts to a certain extent. When two plies of stretched rubber hydrochloride film are laminated by heat and pressure, the heat required for lamination lowers the internal viscosity of the stretched films and these shrink, at least slightly, and the resulting product tends to curl.

Fig. 6 shows somewhat diagrammatically means for laminating three plies of film. The roll 60 is a heavy, heated roll. It presses against the roller 61 with sufficient pressure to laminate any intervening plies. Assume, for example, that the intermediate ply 62 is film which has been stretched laterally as the film 30 of Fig. 1. Assume that the upper ply 63 and the lower ply 64 are stretched longitudinally. Such a film is shown in Fig. 7 in which the upper ply 63 is stretched longitudinally as indicated by the arrows, the intermediate ply 62 is stretched laterally as indicated by the arrows, and the lower ply 64 has been stretched longitudinally the same as the upper ply 63. It has been found desirable in producing such a laminated film to maintain an equal tension on the films 63 and 64 as they enter the laminating device. If the tension on the film 64 is somewhat greater than the tension on the film 63, the tendency of the laminated sheet is to curl downward. If the reverse is the case. i. e., if the tension on the film 63 is greater than the tension on the film 64 as it enters the laminating device, the tendency of the laminated sheet is to curl upward. This is not alone characteristic of three-ply film such as that here discussed. It applies likewise to two-ply film, both plies of which have been stretched longitudinally. It applies also to three-ply film, the center ply of which is not stretched and the upper and lower plies of which are stretched longitudinally. It applies generally to multi-ply continuous film, the outer plies of which are stretched longitudinally. If the longitudinally stretched films are not uniform, it may be necessary to regulate the control devices so as to maintain the plies 63 and 64 under uniform tension throughout the operation.

Three-ply film such as that shown in Fig. 7 has been found to have high tear resistance in all directions and is useful for various purposes. Such three-ply, rubber hydrochloride film, in which the laterally stretched central ply is somewhat thicker than the outer longitudinally stretched plies, has been used in the manufacture of umbrellas, for example. The outer two plies of such a film have advantageously been plasticized to increase their strength. The center ply may be plasticized or unplasticized.

Such three-ply film has been found to have less tendency to curl than a two-ply film, one ply of which is stretched laterally and the other longitudinally. The center ply which has been stretched laterally tends to curl up or down at the edges. The outer plies which have been stretched longitudinally tend to curl up or down at the ends. This is indicated by the curved arrows in Fig. 7. By laminating, the tendency to curl is reduced or eliminated. If there were but two plies, an upper ply stretched longitudinally and a lower ply stretched laterally, the tendency of the under ply to curl downward at the edges would be retarded by the upper ply which had no tendency to curl laterally. The predominating tendency for such a two-ply laminated sheet to curl would therefore be its tendency to curl upward at the edges. Similarly, the tendency for such a two-ply sheet to curl downward at the ends would be overcome by the presence of the laterally stretched sheet as the under ply. The resultant tendency of such a two-ply sheet to curl at the ends would therefore be a tendency for the sheet to curl up.

In the three-ply sheet with the intermediate ply stretched laterally and the upper and lower plies stretched longitudinally as indicated in Fig. 7, there is the same tendency for the intermediate ply to curl upward as downward and the same tendency for the upper and lower plies to curl upward as downward. The three-ply laminated sheet, therefore, has less tendency to curl than the two-ply laminated sheet. This is true whether the intermediate ply is stretched or not stretched at all, and whether or not the intermediate ply is of the same composition as the outer plies. For instance, the inner ply may be plasticized rubber hydrochloride film and the outer plies unplasticized rubber hydrochloride film or vice versa. The inner ply may be rubber hydrochloride and the outer plies may be of other heat-sealable material, and vice versa.

Figs. 10–15 show alternative gripping means which can be employed instead of the tenter clips shown in Figs. 1–3. Figs. 10 and 11 show tongue and groove belts 71 and 72 which are forced together by the channels 73. These may be used for gripping the film 74 to stretch it laterally. The channels may be lubricated as necessary with glycerine, soap or the like. In Figs. 12 and 13, two V-belts 76 and 77 are shown for gripping the film 78. The end of the film protruding to the right of the V-belts may be rolled or folded over to form a bead to enable the belts to obtain a better grip on the film. Such a bead may be used with any type of gripping device. The belts are forced together by the channels 79 and 80, and these channels extend along the left side of the belts to force the belts apart so as to stretch the film laterally. The belts come in contact with the rollers 81. A device of this type may be used instead of the tenter clips for stretching the film.

The device shown in Figs. 10–13 may be used with equipment of the type shown in Fig. 1 or by properly shaping the guiding channels, the belts may carry the film down into a liquid heating bath, such as a water bath or the like, so that the film may be heated and stretched laterally. Instead of using a tongue and grove belt as shown in Figs. 10 and 11 or two V-belts as shown in Fig. 12, two tongue and groove or V-belts may be used with complementary pulleys set at an angle to one another, so that if the film is fed between the belts and pulleys at the points where the pulleys are closest together, the film will be stretched as its edges are moved apart as the belts and pulleys rotate away from the said point at which they are nearest together.

Figs. 14 and 15 show a further alternative means for gripping the edges of the film. The figures show two chains which are forced together by the guide channels 89. The chains shown are of the link and block type. The links 90 join the blocks 91 of the upper chain, and the blocks 92 of the lower chain. The blocks 91 are provided with lugs 93 which protrude down between the links 90 of the lower chain and fit snugly against the ends of the blocks 92 thus gripping the film 94 between the lugs 93 of the upper chain and the ends of the blocks 92 of the lower chain. By properly shaping the channels 89, belts of this type may be guided through any suitable heating zone and by passing the belts through divergent channels the film grasped between them will be stretched.

Returning now to the process of stretching and referring particularly to Fig. 1, it is desired to explain a little more in detail a feature of the process which is dependent upon the heating baffles 16 and 17. As the heated film is stretched, it of course becomes thinner. The thinner the film the more easily it is stretched. Therefore if the film starts to stretch unevenly, and a portion of the film becomes thinner, this thinner portion will stretch more easily than the thicker portion, and the result is that if the film starts to stretch unevenly the stretching is accentuated by the thinner film stretching more than the thicker film. In stretching film laterally, it has been found that there is a decided tendency for the film to stretch irregularly. This may be due to irregularities in the original film or irregularities in the heating of the film. More probably it is due to the inertia of the film which prevents the center portion from being stretched when the film is grasped along the sides and stretched laterally whatever the cause. There is a decided tendency for the film to stretch near the edges more than in the center. This may be due to the speed at which it is desirable to run an apparatus such as shown in Fig. 1 where large production is desired. The speed at which the heated film is passed through the device shown in Fig. 1 would tend to result in sufficient inertia to stretching in the center portion of the film to produce a high tendency to stretch near the tenter clips or other gripping means. This higher tendency of the edges of the film to stretch is overcome in the apparatus shown by maintaining the center of the film at a higher temperature than the edges. This may be controlled by the baffles 16 and 17. As the edges have a greater tendency to stretch than the center portion of the film, the apparatus is so designed that the edges stretch and become thinner and for this reason tend to become more easily stretched. The edge portions of the film are removed from the zone of highest temperature and therefore cool, and as they cool their tendency to stretch is reduced. This offsets the inertia of the inner portion of the film to stretch, and by proper control of the heating of the film with cooling at the edges, a uniform stretch is produced.

Although the invention has been described more particularly as applied to the stretching of rubber hydrochloride film, such as the film now on the market which is sold as Pliofilm sheet material, it is applicable to the stretching of other thermo-stretchable sheets. These sheets may be transparent or pigmented or dyed.

The thickness of the film which may be stretched may vary and the thickness to which it is stretched may vary. The film may be stretched to only about two hundred per cent of its original width but ordinarily will be stretched considerably more, for example, up to six or eight hundred per cent of its original width or more. Ordinarily rubber hydrochloride film will be stretched to four or five or six hundred per cent of its original width. Stretching increases the tensile strength of the film in the direction in which it is stretched, increases the tear resistance of the film in the direction perpendicular to the direction in which it is stretched, and otherwise affects the physical properties of the film.

The source of heat for stretching may be a gas, liquid, solid or vapor. If a liquid is used the edges as stretched may be removed from the liquid to cool them in order to produce a uniform stretch. The temperature used for stretching may vary. For rubber hydrochloride film it will be found desirable to heat the film to a temperature above about 75° C., and ordinarily a temperature between about 90 and 110° C. will be employed. For lamination of two or more plies of rubber hydrochloride film, it will ordinarily be desirable to heat the film to a temperature above about 100 or 105° C. However, the properties of films at elevated temperatures vary so that while a temperature of 105° C. may be desired for producing a certain effect on one film, a somewhat higher or lower temperature will be required for producing a like effect on a different film. For example, the effect of temperature on plasticized rubber hydrochloride film is somewhat different from that produced by the same temperature on unplasticized rubber hydrochloride film. Furthermore the speed to which the film is passed through the apparatus may vary. A speed of about twelve yards per minute was found satisfactory for stretching rubber hydrochloride film.

As examples of the different operations which may be performed on rubber hydrochloride film, the following are cited. Single-ply film 0.08 inch was stretched to film 0.035 inch thick. Another film 0.135 inch was stretched to film 0.08 inch thick. Film 14 inches wide was stretched to a width of 52½ inches. A two-ply film formed by the lamination of two plies of film 0.17 inch thick was stretched to film 0.11 inch thick. The two plies may be laminated by heat and pressure before they enter the oven 3. In this way two or more plies may be laminated before stretching.

The temperatures employed in the oven 3 vary about 170 to 220° F., the lower temperature being used where it was desired to produce in the film the greatest strains, which were relieved on subsequent heating. The higher temperature was used where a very thick film was stretched.

I claim:

1. The method of progressively stretching laterally a continuous sheet of thermo-stretchable material which comprises continuously passing the sheet through a heating zone of limited width bordered on each side by a zone of lower temperature and progressively stretching the film laterally as it passes therethrough thereby bringing the edges of stretched film into the zones of lower temperature to thereby cool them and retard the tendency of the edges of the film to stretch further.

2. The method of stretching laterally a continuous sheet of rubber hydrochloride film which comprises passing the film through a heating zone thereby raising the temperature of the film and heating the film uniformly as it passes through the heating zone and while in the heating zone, stretching the film laterally by gripping the film at its edges and as the edges of the film stretch more than the central portion of the film, cooling the stretched edges to retard their tendency to stretch further.

3. The method of treating a continuous sheet of thermo-stretchable material which comprises passing the sheet continuously, first through a heating zone and then while it is heated, stretching it laterally and then passing it through pressure rolls and there uniting it to two plies of longitudinally stretched heat-sealable material by pressing the plies together while hot, one ply being united to one side of the laterally stretched film and the other ply being united to the other side of the laterally stretched film and maintaining an equal tension on the two longitudinally stretched plies as they are laminated to the laterally stretched ply.

FOSTER J. YOUNG.

REFERENCES CITED

The following references are of record in the file of this patent:

UNITED STATES PATENTS

| Number | Name | Date |
|---|---|---|
| 2,074,285 | Studt et al. | Mar. 16, 1937 |
| 1,784,758 | Sheppard et al. | Dec. 9, 1930 |
| 2,123,155 | Groff | July 5, 1938 |
| 1,126,753 | Graves | Feb. 2, 1915 |
| 2,109,382 | Frick | Feb. 22, 1938 |
| 1,894,467 | Jacque | Jan. 17, 1937 |
| 671,213 | Johnston | Apr. 2, 1901 |
| 2,273,466 | Dinsmore | Feb. 17, 1942 |
| 2,259,347 | Mallory | Oct. 14, 1941 |
| 2,256,159 | Young | Sept. 16, 1941 |
| 2,335,190 | Minich | Nov. 23, 1943 |
| 2,047,497 | Studt | July 14, 1936 |

FOREIGN PATENTS

| Number | Country | Date |
|---|---|---|
| 497,788 | Great Britain | Dec. 28, 1938 |